United States Patent
Avila et al.

(10) Patent No.: US 10,544,630 B1
(45) Date of Patent: Jan. 28, 2020

(54) SYSTEMS AND METHODS FOR SLUG MITIGATION

(71) Applicants: Chevron U.S.A. Inc., San Ramon, CA (US); Cranfield University, Cranfield, Bedfordshire (GB)

(72) Inventors: Carlos Avila, Katy, TX (US); Yi Cao, Milton Keynes (GB); Henry Kwaw Ayisi Tandoh, London (GB)

(73) Assignees: CHEVRON U.S.A. INC., San Ramon, CA (US); CRANFIELD UNIVERSITY, Cranfield (GB)

( * ) Notice: Subject to any disclaimer, the term of this patent is extended or adjusted under 35 U.S.C. 154(b) by 0 days.

(21) Appl. No.: 16/218,022

(22) Filed: Dec. 12, 2018

(51) Int. Cl.
- *E21B 17/01* (2006.01)
- *E21B 43/12* (2006.01)
- *F16L 43/00* (2006.01)

(52) U.S. Cl.
CPC ............ *E21B 17/01* (2013.01); *E21B 43/121* (2013.01); *F16L 43/001* (2013.01)

(58) Field of Classification Search
CPC ................................ E21B 17/01; E21B 43/121
See application file for complete search history.

(56) References Cited

U.S. PATENT DOCUMENTS

| | | | | |
|---|---|---|---|---|
| 4,456,073 A * | 6/1984 | Barth | ...................... | E21B 17/01 166/355 |
| 5,553,976 A * | 9/1996 | Korsgaard | .............. | E21B 17/22 405/195.1 |
| 6,739,804 B1 * | 5/2004 | Haun | ..................... | E21B 17/015 166/355 |
| 7,749,462 B2 * | 7/2010 | Caro | ......................... | C10G 9/18 422/198 |
| 7,857,059 B2 * | 12/2010 | Shen | ....................... | E21B 43/01 138/120 |
| 8,393,398 B2 * | 3/2013 | Makogon | ........... | B01D 19/0063 166/345 |
| 8,550,171 B2 * | 10/2013 | Wajnikonis | ........... | E21B 17/015 166/346 |

(Continued)

OTHER PUBLICATIONS

T. Makogon et al, "A new passive technique for severe slugging attenuation", BHR Group 2011 Multiphase 15, pp. 1-12.

(Continued)

*Primary Examiner* — Matthew R Buck
(74) *Attorney, Agent, or Firm* — King & Spalding LLP (57) ABSTRACT

A system for mitigating slugging in the conveyance of a subterranean resource can include at least one first pipe disposed proximate to a subterranean formation, where the at least one first pipe has a first cavity through which the subterranean resource traverses from the subterranean formation. The system can also include at least one second pipe disposed proximate to field equipment at an operating platform, where the at least one second pipe has a second cavity through which the subterranean resource traverses, where the field equipment is used to extract the subterranean resource. The system can also include a first slug mitigation assembly disposed between the at least one first pipe and the at least one second pipe, where the first slug mitigation assembly includes a first plurality of non-linear segments for reducing accumulation of gas or liquid pockets in the subterranean resource as the subterranean resource flows therethrough.

20 Claims, 8 Drawing Sheets

(56) References Cited

U.S. PATENT DOCUMENTS

| | | | |
|---|---|---|---|
| 9,777,539 B2* | 10/2017 | Jones | E21B 17/01 |
| 9,896,911 B2* | 2/2018 | Maher | E21B 41/0007 |
| 2004/0163817 A1* | 8/2004 | Horton, III | E21B 17/015 |
| | | | 166/367 |
| 2007/0028984 A1* | 2/2007 | Caro | B01J 8/062 |
| | | | 138/177 |

OTHER PUBLICATIONS

Sarica et al., "A New Technique to Eliminate Severe Slugging in Pipeline/Riser Systems", Society of Petroleum Engineers Inc., SPE 63185, 2000, pp. 1-9.

* cited by examiner

SYSTEMS AND METHODS FOR SLUG MITIGATION

TECHNICAL FIELD

The present disclosure relates generally to the conveyance of hydrocarbons, and more specifically to systems and methods for mitigating slugging when conveying multiphase hydrocarbons.

BACKGROUND

Slugging is a problem that is especially related to mature oil fields. As an oil well ages, the downhole pressure reduces, and gases and liquids in the multiphase hydrocarbons tend to separate in the flowlines and risers as the flowlines travel down a decline to a subsequent incline. Typically, this is due to the heavier liquids moving faster than corresponding gases, which results in the formation of liquid and gas pockets (also called slugs). The formation of slugs can result in large pressure and production fluctuations. Such pressure and production fluctuations can give rise to operational hazards and can damage downstream equipment.

Such slugging problems can also arise on land when piping multiphase hydrocarbons. Slugging can also occur at the intersection of a downwardly inclined portion of pipeline with an upwardly inclined portion of pipeline, such as through terrain having hills or mountains, which is known in the art as "terrain induced slugging".

SUMMARY

In general, in one aspect, the disclosure relates to a system for mitigating slugging in the conveyance of a subterranean resource. The system can include at least one first pipe disposed proximate to a subterranean formation, where the at least one first pipe has a first cavity through which the subterranean resource traverses from the subterranean formation. The system can also include at least one second pipe disposed proximate to field equipment at an operating platform, where the at least one second pipe has a second cavity through which the subterranean resource traverses, where the field equipment is used to extract the subterranean resource. The system can further include a first slug mitigation assembly disposed between the at least one first pipe and the at least one second pipe, where the first slug mitigation assembly includes a first plurality of non-linear segments for reducing accumulation of gas or liquid pockets in the subterranean resource as the subterranean resource flows therethrough.

In another aspect, the disclosure can generally relate to a slug mitigation assembly for mitigating slug accumulation in a field operation. The assembly can include a plurality of first non-linear segments disposed in series with each other, where the plurality of first non-linear segments form a body. The first end of the body can be configured to be coupled to a first pipe section disposed proximate to and above a subterranean formation, where a second end of the body and is configured to be coupled to a second pipe section disposed proximate to field equipment, where the field equipment is disposed proximate to an operating platform. The body can be configured to allow a subterranean resource to flow therethrough. The plurality of non-linear segments can be configured to reduce accumulation of gas or liquid pockets in the subterranean resource as the subterranean resource flows therethrough.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

In general, example embodiments provide systems, methods, and devices for slug mitigation. While example embodiments are described herein as being used in offshore oilfield operations, example embodiments can also be used in other applications and/or land-based oilfield operations in which slug mitigation can be used. Example embodiments of slug mitigation provide a number of benefits. Such benefits can include, but are not limited to, avoiding downtime in a field operation, reduced operating costs, and compliance with industry standards that apply to field operations used in certain environments.

Example embodiments discussed herein can be used in any type of a number of environments (e.g., subsea, hazardous, fresh water, salt water). A user as discussed herein can be any person or entity involved in an oilfield implementation or a similar subterranean extraction activity. Examples of a user as described herein may include, but are not limited to, an engineer, a manufacturer, an operator, a consultant, an inventory management system, an inventory manager, a regulatory entity, a foreman, a company man, a maintenance and labor scheduling system, and a manufacturer's representative.

As discussed below, example slug mitigation assemblies described herein have multiple segments, at least some of which are non-linear. All segments of a slug mitigation assembly are tubular, and so are in three dimensions. The phrases "two-dimensional" and "three-dimensional" are used herein to describe whether a segment is not spiral-shaped and spiral-shaped, respectively. Therefore, the terms "two-dimensional" and "three-dimensional" refer to the center axis along the length of the segment as opposed to the entirety of the segment.

The example slug mitigation assemblies described herein can be made of one or more of a number of suitable materials to allow the field equipment and/or other associated components of a system to meet certain standards and/or regulations while also maintaining durability and efficient slug mitigation in light of the one or more conditions under which the field equipment and/or other associated components of the system can be exposed. Examples of such materials can include, but are not limited to, aluminum, stainless steel, fiberglass, glass, plastic, ceramic, and rubber.

Example slug mitigation assemblies (or segments thereof) described herein can be made from a single piece (as from a mold, injection mold, die cast, or extrusion process). In addition, or in the alternative, example slug mitigation assemblies (or segments thereof) can be made from multiple pieces that are mechanically coupled to each other. In such a case, the multiple pieces or segments can be mechanically coupled to each other using one or more of a number of coupling methods, including but not limited to epoxy, welding, fastening devices, detents, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, retaining, abutting against, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more segments of an example slug mitigation assembly to become mechanically coupled, directly or indirectly, to another segment of the slug mitigation assembly and/or other piping. A coupling feature can include, but is not limited to, a portion of a hinge, an aperture, a recessed area, a protrusion, a slot, a spring clip, a male connector end, a female connector end, a tab, a detent, and mating threads. One segment of an example slug mitigation assembly can be coupled to another segment of the slug mitigation assembly and/or other piping by the direct use of one or more coupling features.

In addition, or in the alternative, a segment of an example slug mitigation assembly can be coupled to another segment of the slug mitigation assembly and/or other piping using one or more independent devices that interact with one or more coupling features disposed on the slug mitigation assembly. Examples of such devices can include, but are not limited to, a pin, a male connector end, a female connector end, a hinge, epoxy, adhesive, welding, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature. In the foregoing figures showing example embodiments of slug mitigation, one or more of the components shown may be omitted, repeated, and/or substituted. Accordingly, example embodiments of slug mitigation should not be considered limited to the specific arrangements of components shown in any of the figures. For example, features shown in one or more figures or described with respect to one embodiment can be applied to another embodiment associated with a different figure or description.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In certain example embodiments, field operations in which example slug mitigation is used are subject to meeting certain standards and/or requirements. For example, the National Electrical Manufacturers Association (NEMA), the Occupational Safety and Health Administration (OSHA), the Environmental Protection Agency (EPA), the Department of Energy (DOE), the Society of Petroleum Engineers (SPE), and the American Petroleum Institute (API) set standards related to petroleum operations. Use of example embodiments described herein meet (and/or allow a corresponding system to meet) such standards when required.

Example embodiments of slug mitigation will be described more fully hereinafter with reference to the accompanying drawings, in which example embodiments of slug mitigation are shown. Slug mitigation may, however, be embodied in many different forms and should not be construed as limited to the example embodiments set forth herein. Rather, these example embodiments are provided so that this disclosure will be thorough and complete, and will fully convey the scope of slug mitigation to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of slug mitigation. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
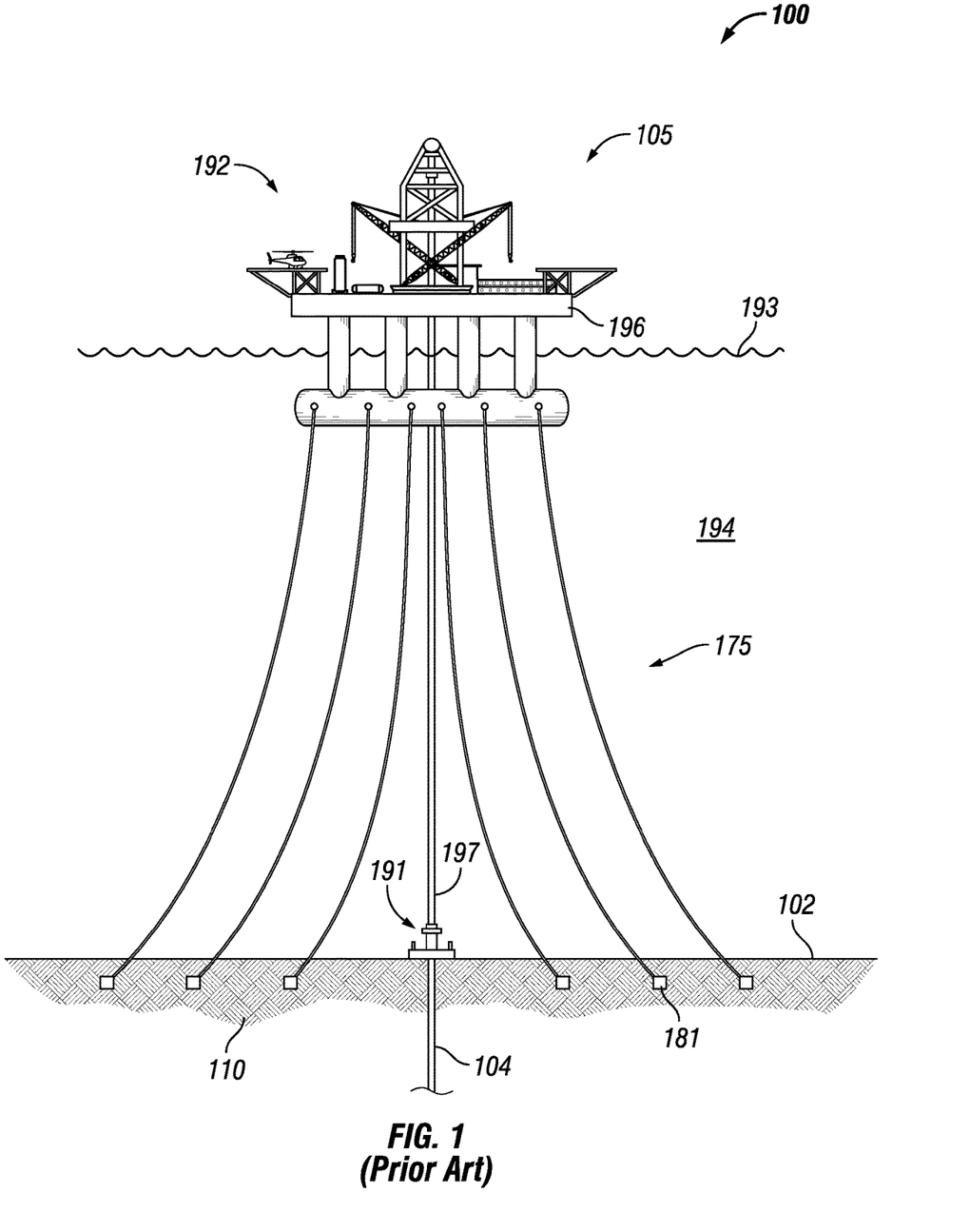
FIG. 1 shows a field system in which example embodiments can be used.

FIG. 1 shows a field system 100 in which mooring lines 175 are used. The system 100 includes a semi-submersible platform 105 that floats in a large and deep body of water 194. Part of the platform 105 is above the water line 193, and the rest of the platform 105 is in the water 194 below the water line 193. Part of the platform 105 includes an operating platform 196 that is above the water line 193. There are a number of pieces of field equipment 192 (e.g., derrick, tongs, sensors, pumps, top drive) located on or above the operating platform 196. In some cases, at least some of the field equipment 192 can be disposed in the water 194.

The platform 105 in this case is used for subterranean field operations, in which exploration, and production phases of the field operation are executed to extract one or more subterranean resources (e.g., oil, natural gas, water, hydrogen gas) from and/or inject resources (e.g., carbon dioxide) into the subterranean formation 110. To accomplish this, a riser 197 (a number of series-connected pipes each having a cavity) is disposed between the operating platform 196 and the subsea surface 102, and other field equipment (e.g., casing, tubing string) is disposed within the riser 197. At the bottom of the riser 197 at the subsea surface 102 is wellhead equipment 191 (e.g., blowout preventer, Christmas tree). Extending beyond the wellhead equipment 191 and disposed in the subterranean formation 110 is the wellbore 104.

To help keep the platform 105 from deviating too far from its position along the water line 193 (in this case, in a horizontal direction), multiple mooring lines 175 are used. Each mooring line 175 in this case has one end attached to part of the platform 105 (in this case, part of the platform 105 that is disposed in the water 194), and the other end is anchored, using an anchor device 181, in the subterranean formation 110 below the surface 102. In addition, or in the alternative, mooring lines 175 can be anchored to other objects and/or have different orientations compared to what is shown in FIG. 1. For example, one or more mooring lines 175 can be laid out on the surface 102 and anchored to other mooring lines 175 that are attached to the platform 105. In any case, each mooring line 175 can be several thousand feet long. Each mooring line 175 can be a single continuous line or multiple shorter line segments that are coupled end-to-end to each other. Similarly, the riser 197 can be several hundred or several thousand feet long.

Figure 2:
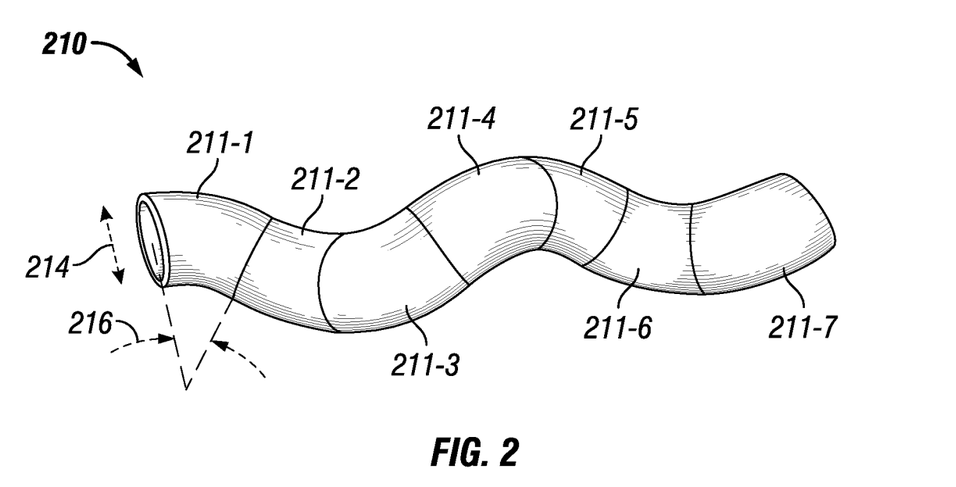
FIG. 2 shows a number of non-linear segments of a slug mitigation assembly in accordance with certain example embodiments.

FIG. 2 shows a number of non-linear segments 211 of a slug mitigation assembly 210 in accordance with certain example embodiments. The slug mitigation assembly 210 can include any of a number of non-linear segments that are coupled in series with respect to each other. In this example, the slug mitigation assembly 210 of FIG. 2 has seven non-linear segments 211, where non-linear segment 211-1 is coupled to non-linear segment 211-2, which is coupled to non-linear segment 211-3, which is coupled to non-linear segment 211-4, which is coupled to non-linear segment 211-5, which is coupled to non-linear segment 211-6, which is coupled to non-linear segment 211-7.

Each non-linear segment 211 of FIG. 2 has substantially the same shape and size relative to the other non-linear segments 211. Each non-linear segment 211 has a substantially circular cross-section having an inner diameter 214. In alternative embodiments, each non-linear segment 211 can have any of a number of other cross-sectional shapes, including but not limited to oval, square, triangular, hexagonal, and irregular. Also, the shape and/or size of the cross-section of a non-linear segment 211 can be substantially uniform (as in FIG. 2) or variable along the length of the non-linear segment 211. Further, one or more of the characteristics (e.g., length, shape, size, inner diameter 214) of one non-linear segment 211 can be the same as, or different than, the corresponding characteristics of one or more other non-linear segments 211 of the slug mitigation assembly 210.

As discussed above, multiple non-linear segments 211 can be formed from a single piece of pipe. Alternatively, some or all of the non-linear segments 211 can be discrete pieces that are coupled to each other using one or more of a number of coupling features. In such a case, adjacent non-linear segments 211 that are coupled to each other can be fixedly or detachably coupled.

In this case, each non-linear segment 211 is arcuate, forming an angle 216 from end-to-end of approximately 45°. This angle 216 for a non-linear segment 211 can be any other angle that is greater than or less than 45°. Also, each non-linear segment 211 can form more than one angle 216 along its length. While each non-linear segment 211 is planar, the overall slug mitigation assembly 210 is not planar because each non-linear segment 211 is rotationally offset with respect to each adjacent non-linear segment 211, thereby creating a multi-planar (the center axis along the length of the segment 211 is laid out in three-dimensions) serpentine shape. If each non-linear segment 211 of the slug mitigation assembly 210 of FIG. 2 was not rotationally offset from each adjacent non-linear segment 211, then the slug mitigation assembly 210 would have a planar (the center axis along the length of the segment 211 is laid out in two-dimensions) serpentine shape.

Figure 3:
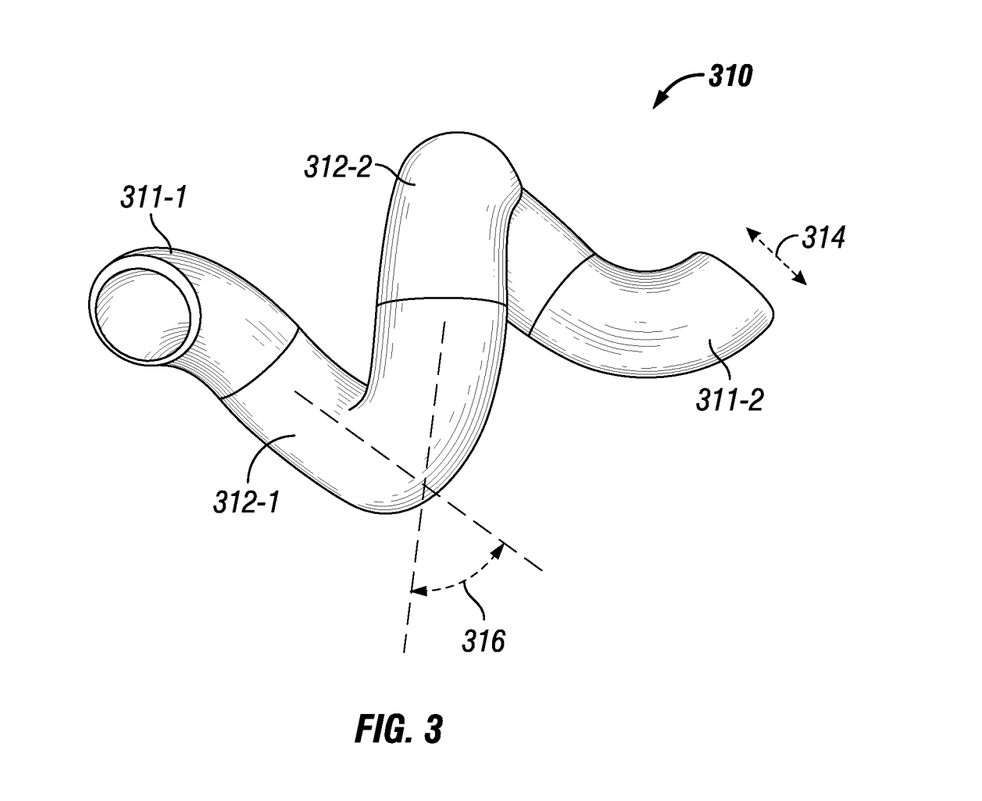
FIG. 3 shows a number of non-linear segments of another slug mitigation assembly in accordance with certain example embodiments.

FIG. 3 shows a number of non-linear segments 311 of another slug mitigation assembly 310 in accordance with certain example embodiments. Referring to FIGS. 2 and 3, the slug mitigation assembly 310 of FIG. 3 has four non-linear segments 311, where non-linear segment 311-1 is coupled to non-linear segment 312-1, which is coupled to non-linear segment 312-2, which is coupled to non-linear segment 311-2. In this case, non-linear segment 311-1 and non-linear segment 311-2 are substantially the same as the non-linear segments 211 of the slug mitigation assembly 210 of FIG. 2.

By contrast, non-linear segment 312-1 and non-linear segment 312-2, while having characteristics (e.g., shape, size, length, inner diameter) substantially similar to each other, have one or more characteristics that are different from the corresponding characteristics of non-linear segment 311-1 and non-linear segment 311-2. For example, non-linear segment 312-1 and non-linear segment 312-2 each twist into more than one plane (the center axis along the length of the segments 311 is laid out in three-dimensions), where the twist causes the ends of the non-linear segment 312 to form an angle 316 relative to each other. However, all non-linear segments 311 of FIG. 3 have a circular cross-sectional shape with an inner diameter 314.

Figure 4:
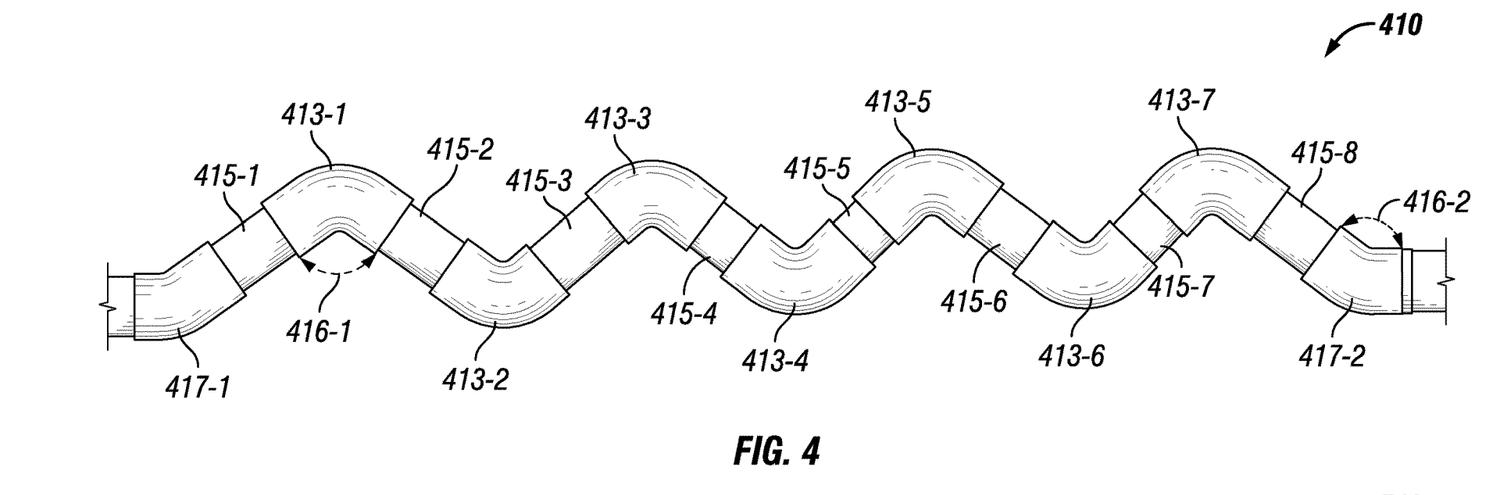
FIG. 4 shows yet another slug mitigation assembly in accordance with certain example embodiments.

FIG. 4 shows yet another slug mitigation assembly 410 in accordance with certain example embodiments. Referring to FIGS. 2 through 4, the slug mitigation assembly 410 includes linear segments 415, non-linear segments 413, and non-linear segments 417 that are coupled in series with respect to each other. In this case, the angles of the bends of the slug mitigation assembly 410 are all in the same plane (the center axis along the length of each of the segments is laid out in two-dimensions), as opposed to the non-planar twists of assemblies 210 and 310.

The slug mitigation assembly 410 is formed by non-linear segment 417-1, which is coupled to linear segment 415-1, which is coupled to non-linear segment 413-1, which is coupled to linear segment 415-2, which is coupled to non-linear segment 413-2, which is coupled to linear segment 415-3, which is coupled to non-linear segment 413-3, which is coupled to linear segment 415-4, which is coupled to non-linear segment 413-4, which is coupled to linear segment 415-5, which is coupled to non-linear segment 413-5, which is coupled to linear segment 415-6, which is coupled to non-linear segment 413-6, which is coupled to linear segment 415-7, which is coupled to non-linear segment 413-7, which is coupled to linear segment 415-8, which is coupled to non-linear segment 417-2.

Non-linear segment 417-1 and non-linear segment 417-2 have substantially the same characteristics (e.g., inner diameter, shape, cross-sectional shape, angle) as each other. For example, the bend that defines non-linear segment 417-1 and non-linear segment 417-2 forms angle 416-2, which in this case is approximately 135°. Similarly, the seven non-linear segments 413 have substantially the same characteristics (e.g., inner diameter, shape, cross-sectional shape, angle) as each other. For example, the bend that defines each non-linear segment 413 forms angle 416-1, which in this case is approximately 90°. One or more of the characteristics of the non-linear segments (e.g., non-linear segments 417, non-linear segments 413) can differ from the corresponding characteristics of the linear segments 415. For example, while the inner diameter of non-linear segments 417, non-linear segments 413, and linear segments 415 can be the same, the outer diameter of linear segments 415 can be different than (e.g., less than) the outer diameter of non-linear segments 417 and non-linear segments 413.

The angles 416 formed by each non-linear segment 413 and/or each non-linear segment 417 can be different (e.g., greater than, less than) compared to what is shown in FIG. 4. Each linear segment 415 of the slug mitigation assembly 410 of FIG. 4 has no curvature, either in two or three dimensions. When the various segments of the slug mitigation assembly 410 are coupled to each other, as shown in FIG. 4, the slug mitigation assembly 410 has a sawtooth shape. Some of the characteristics of the non-linear segments (e.g., non-linear segments 417, non-linear segments 413) can differ from the corresponding characteristics of the linear segments 415

Figure 5:
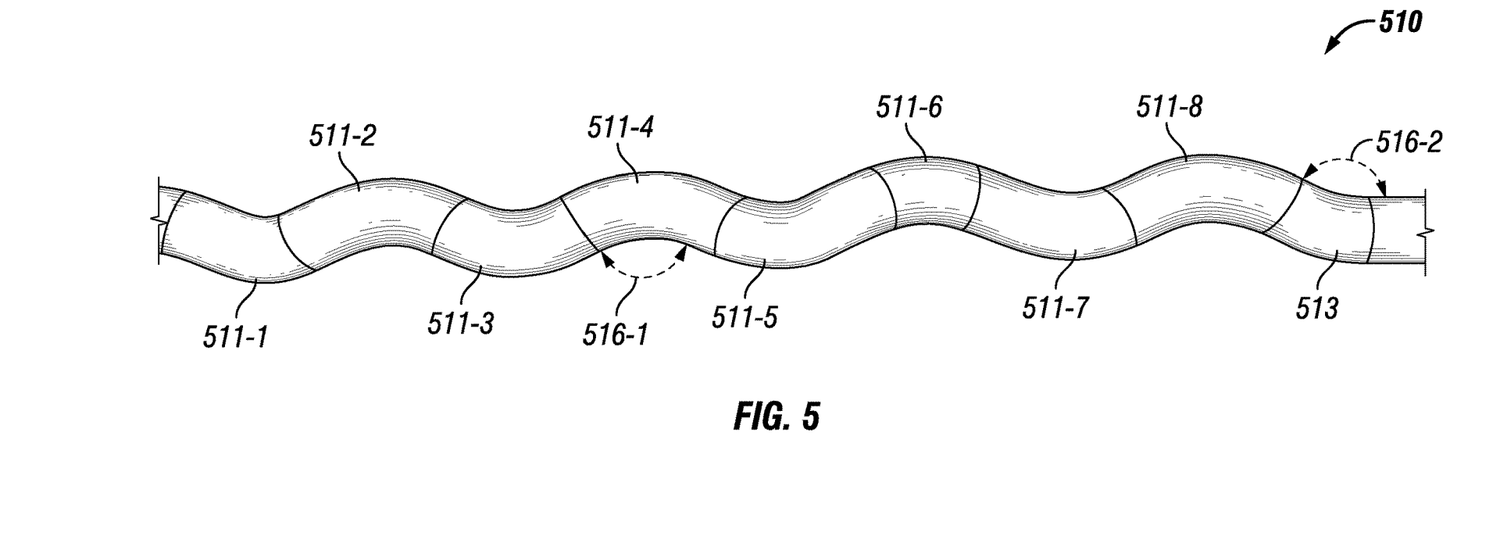
FIG. 5 shows a portion of still another slug mitigation assembly in accordance with certain example embodiments.

FIG. 5 shows a portion of still another slug mitigation assembly 510 in accordance with certain example embodiments. Referring to FIGS. 2 through 5, the slug mitigation assembly 510 includes non-linear segments 511 and non-linear segment 513 that are coupled in series with respect to each other. In this case, the bends of the slug mitigation assembly 510 are two-dimensional (planar), as opposed to a structure with non-planar, three-dimensional twists. In this example, the portion of the slug mitigation assembly 510 of FIG. 5 has eight non-linear segments 511 and one non-linear segment 513, where non-linear segment 511-1 is coupled to non-linear segment 511-2, which is coupled to non-linear segment 511-3, which is coupled to non-linear segment 511-4, which is coupled to non-linear segment 511-5, which is coupled to non-linear segment 511-6, which is coupled to non-linear segment 511-7, which is coupled to non-linear segment 511-8, which is coupled to non-linear segment 513.

The non-linear segments 511 have substantially the same characteristics (e.g., diameter, shape, cross-sectional shape, angle) as each other. For example, the bend that defines each of the non-linear segments 511 forms angle 516-1, which in this case is approximately 120°. Similarly, the non-linear segment 513 has a bend that forms angle 516-2, which in this case is approximately 150°. The angles 516 formed by each non-linear segment 511 and/or the non-linear segment 513 can be different (e.g., greater than, less than) compared to what is shown in FIG. 5.

While at least some of the configurations of the example slug mitigation assemblies described above are unique, slug mitigation assemblies exist in the current art. In current field applications, a single slug mitigation assembly is disposed at the bottom of the riser, substantially on the subsea surface (e.g., subsea surface 102), and is oriented vertically (e.g., in parallel with the riser 197). This location of the slug mitigation assemblies in the current art can pose production issues if part of a slug mitigation assembly becomes blocked, in full or in part, with a slug. The subsea floor can be hundreds or thousands of feet under water, and removing or breaking up a slug in a slug mitigation assembly located at the subsea floor can be time-consuming and expensive.

By contrast, with example embodiments, not only are the configurations of the slug mitigation assemblies described herein unique relative to the current art, but the location and/or orientation of the slug mitigation assemblies described herein are also unique relative to the current art. FIGS. 6 through 11 below show some examples of different locations and/or configurations in which example slug mitigation assemblies can be used to more efficiently and effectively remove slugs while also making the removal of a full or partial slug blockage much easier, less time consuming, and less expensive.

Figure 6:
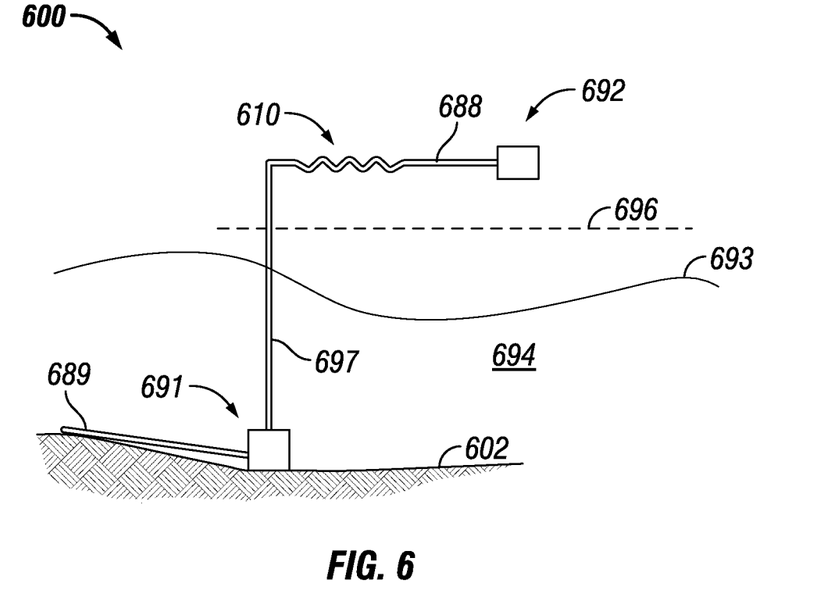
FIG. 6 shows a single-line configuration of a field system in accordance with certain example embodiments.

FIG. 6 shows a single-line configuration of a field system 600 in accordance with certain example embodiments. Referring to FIGS. 1 through 6, the field system 600 of FIG. 6 has several features and components that are substantially similar to corresponding features and components of the system 100 of FIG. 1. For example, the field system 600 of FIG. 6 includes field equipment 692 located on or above an operating platform 696, which is disposed above a water level 693 of water 694. A riser 697 extends from the operating platform 696 to approximately the subsea surface 602. At the bottom of the riser 697 is wellhead equipment 691, and extending beyond the wellhead equipment 691 along the subsea surface 602 is a subsea flowline 689.

Also, disposed at the top of the riser 697 is an example slug mitigation assembly 610, and disposed between the slug mitigation assembly 610 and the field equipment 692 is additional piping 688. In this case, the slug mitigation assembly 610, the additional piping 688, and the field equipment 692 are disposed above the water level 693 and above the operating platform 696. Also, in this example, the slug mitigation assembly 610 is oriented horizontally (i.e., having a long axis that is parallel with a major plane of the operating platform 696).

Figure 7:
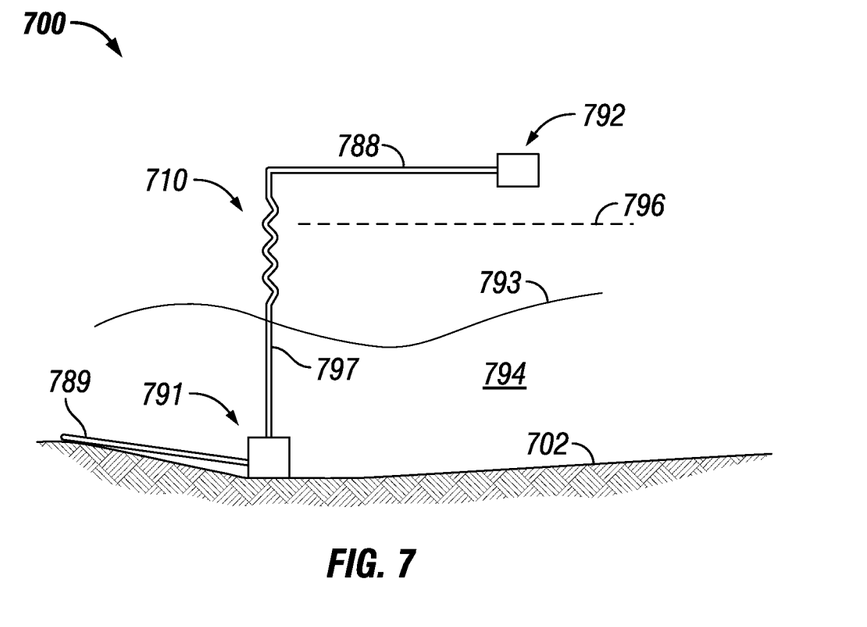
FIG. 7 shows a single-line configuration of another field system in accordance with certain example embodiments.

FIG. 7 shows a single-line configuration of another field system 700 in accordance with certain example embodiments. Referring to FIGS. 1 through 7, the field system 700 of FIG. 7 is substantially similar to the field system 600 of FIG. 6, except as described below. For example, the field system 700 of FIG. 7 includes field equipment 792 located on or above an operating platform 796, which is disposed above a water level 793 of water 794. A riser 797 extends from the operating platform 796 to approximately the subsea surface 702. At the bottom of the riser 797 is wellhead equipment 791, and extending beyond the wellhead equipment 791 along the subsea surface 702 is a subsea flowline 789.

Also, disposed at the top of the riser 797 is an example slug mitigation assembly 710, and disposed between the slug mitigation assembly 710 and the field equipment 792 is additional piping 788. In this case, the slug mitigation assembly 710, the additional piping 788, and the field equipment 792 are disposed above the water level 793 and at or above the operating platform 796. Also, in this example, the slug mitigation assembly 710 is oriented vertically (i.e., having a long axis that is perpendicular to a major plane of the operating platform 796).

Figure 8:
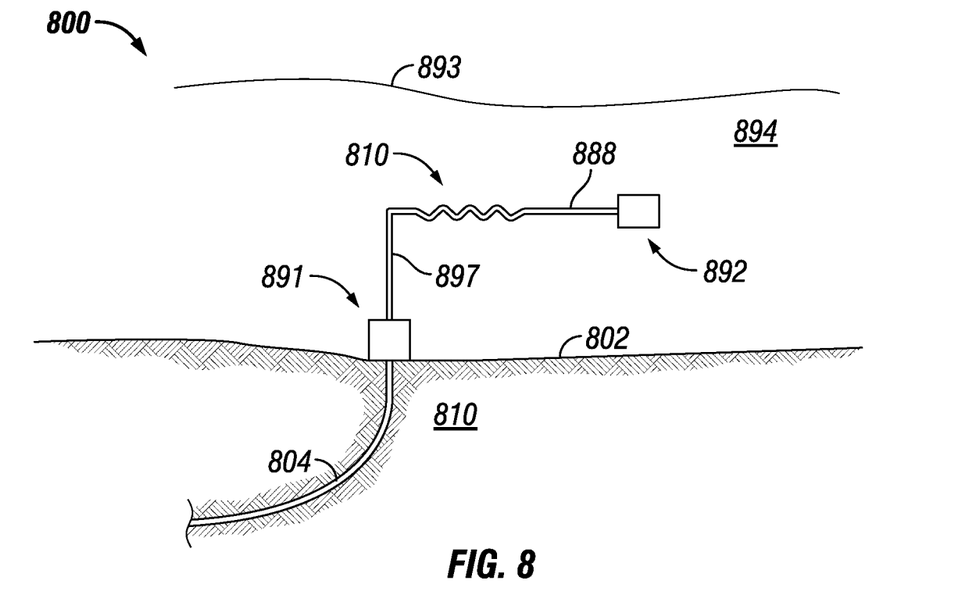
FIG. 8 shows a single-line configuration of yet another field system in accordance with certain example embodiments.

FIG. 8 shows a single-line configuration of yet another field system 800 in accordance with certain example embodiments. Referring to FIGS. 1 through 8, the field system 800 of FIG. 8 is substantially similar to the field systems discussed above, except as described below. For example, the field system 800 of FIG. 8 includes field equipment 892 located in water 894 below the water level 893. The field equipment 892 can be located much closer to the water's surface 893 than to the subsea surface 802.

A riser 897 extends upward in the water 894 from the wellhead equipment 891, which is located on the subsea surface 802. Also, extending below the wellhead equipment 891 into the subterranean formation 810 is a wellbore 804. Further, disposed at the top of the riser 897 in the water 894 is an example slug mitigation assembly 810, and disposed between the slug mitigation assembly 810 and the field equipment 892 in the water 894 is additional piping 888. In this case, the slug mitigation assembly 810 is oriented horizontally (i.e., having a long axis that is parallel to the water's surface 893).

Figure 9:
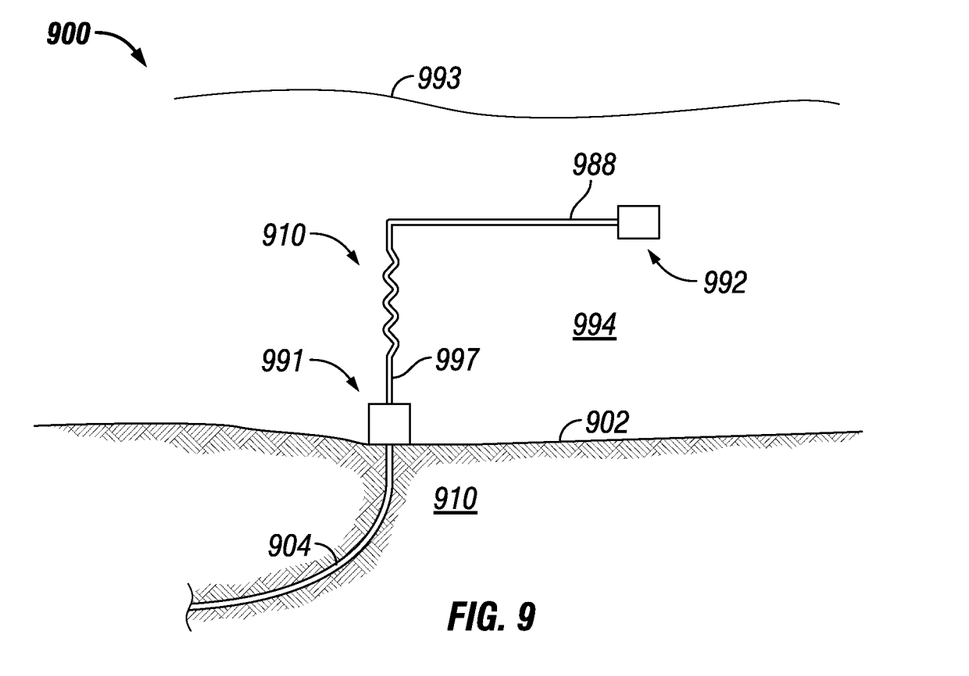
FIG. 9 shows a single-line configuration of still another field system in accordance with certain example embodiments.

FIG. 9 shows a single-line configuration of still another field system 900 in accordance with certain example embodiments. Referring to FIGS. 1 through 9, the field system 900 of FIG. 9 is substantially similar to the field system 800 of FIG. 8, except as described below. For example, the field system 900 of FIG. 9 includes field equipment 992 located in water 994 below the water's surface 993. The field equipment 992 can be located much closer to the water's surface 993 than to the subsea surface 902.

A riser 997 extends upward in the water 994 from the wellhead equipment 991, which is located on the subsea surface 902. Also, extending below the wellhead equipment 991 into the subterranean formation 910 is a wellbore 904. Further, disposed at the top of the riser 997 in the water 994 is an example slug mitigation assembly 910, and disposed between the slug mitigation assembly 910 and the field equipment 992 in the water 994 is additional piping 988. In this case, the slug mitigation assembly 910 is oriented vertically (i.e., having a long axis that is perpendicular to the water's surface 993).

Figure 10:
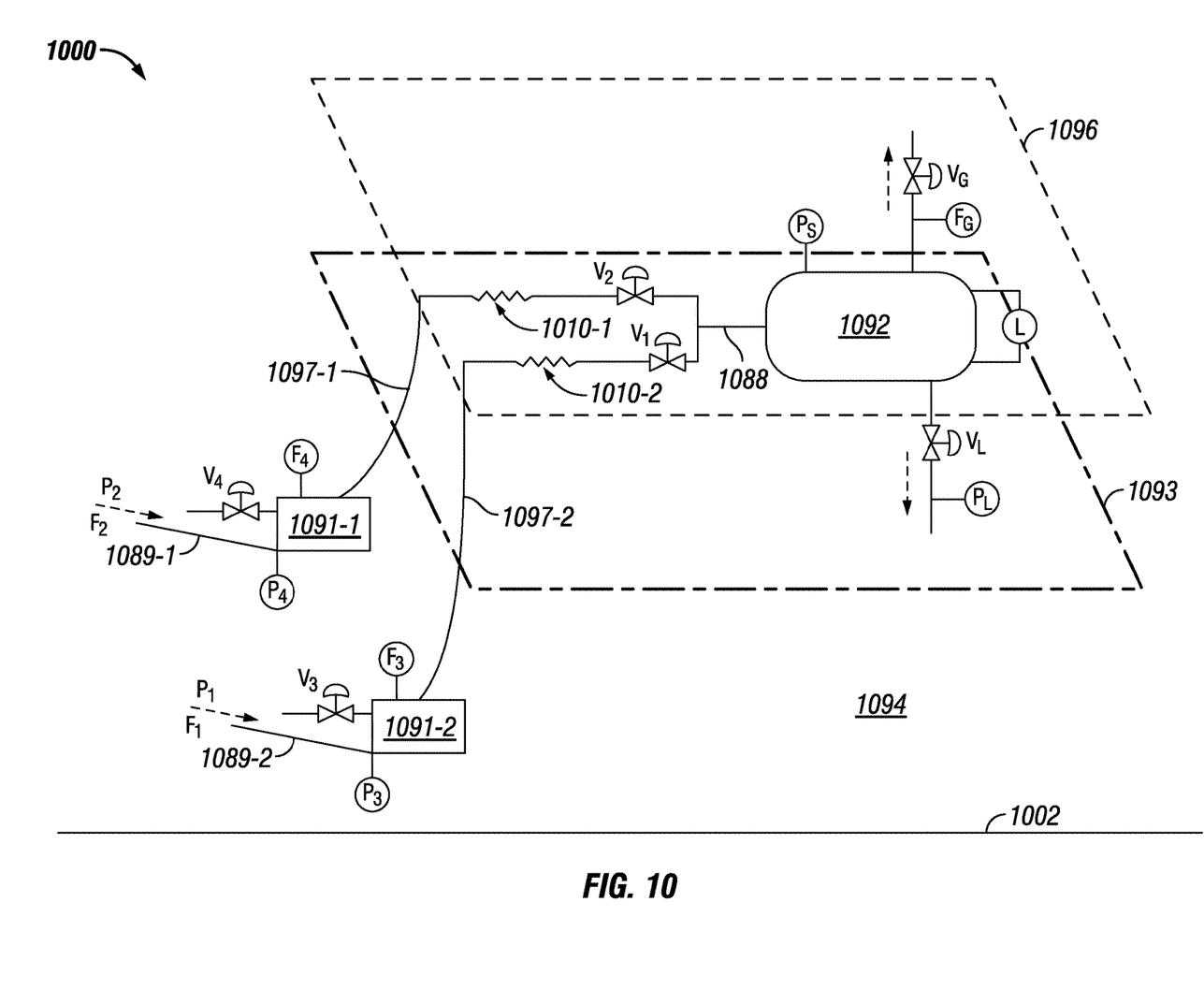
FIG. 10 shows a single-line configuration of yet another field system in accordance with certain example embodiments.
Figure 11:
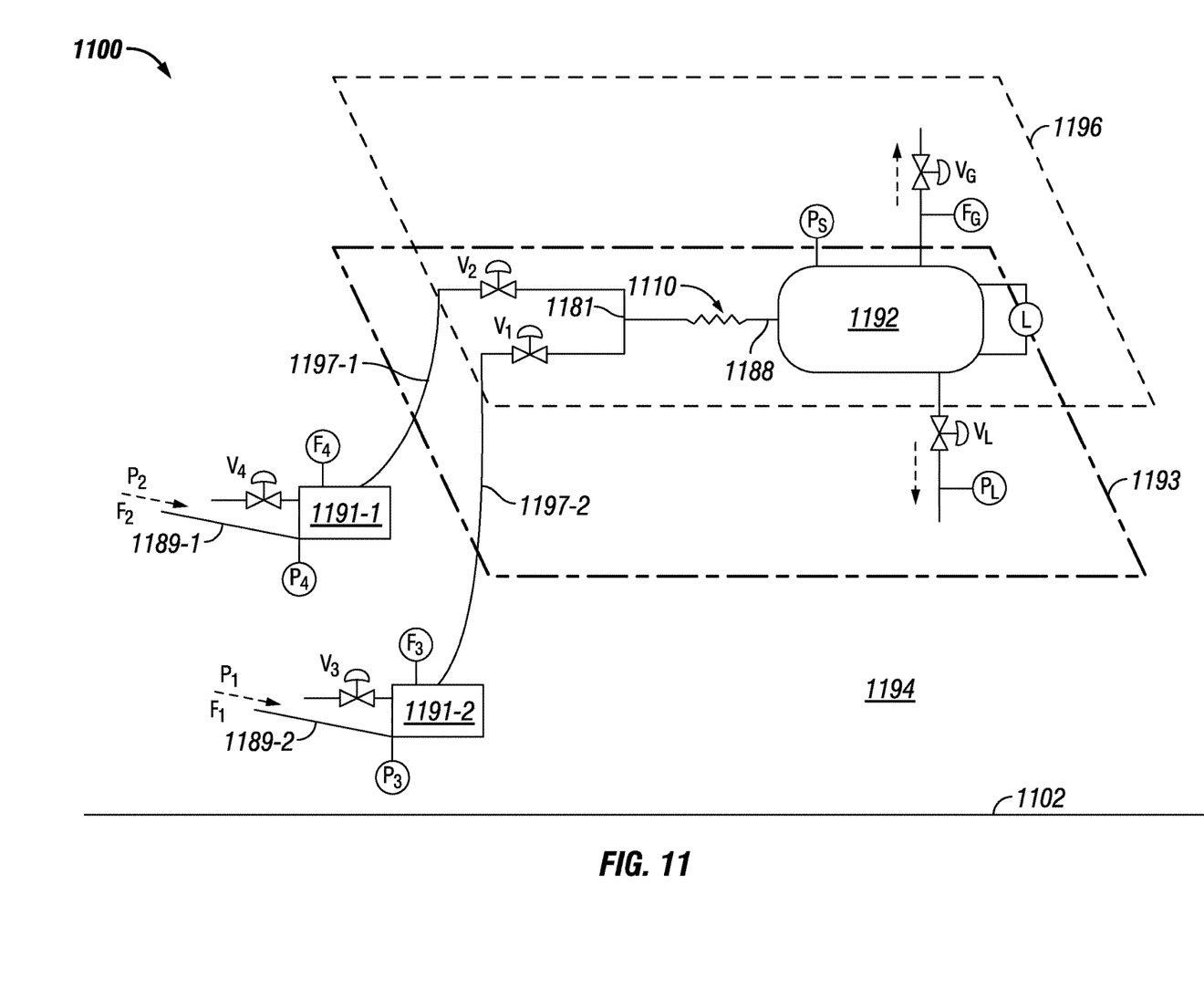
FIG. 11 shows a single-line configuration of still another field system in accordance with certain example embodiments.

FIGS. 10 and 11 show examples where multiple slug mitigation assemblies can be used as part of a slug mitigation system for a field system. FIG. 10 shows a single-line configuration of yet another field system 1000 in accordance with certain example embodiments. Referring to FIGS. 1 through 10, the field system 1000 of FIG. 10 is substantially similar to the field systems discussed above, except as described below. For example, the field system 1000 of FIG. 10 includes field equipment 1092 located on or above an operating platform 1096, which is disposed above a water level 1093 of water 1094. In this case, there are two risers 1097 (riser 1097-1 and riser 1097-2).

Both risers 1097 extend downward from the operating platform 1096 to approximately the subsea surface 1002. At the bottom of riser 1097-1 is wellhead equipment 1091-1, and extending beyond wellhead equipment 1091-1 along the subsea surface 1002 is a subsea flowline 1089-1. Similarly, at the bottom of riser 1097-2 is wellhead equipment 1091-2, and extending beyond wellhead equipment 1091-2 along the subsea surface 1002 is a subsea flowline 1089-2.

Disposed at the top of riser 1097-1 is an example slug mitigation assembly 1010-1, and disposed at the top of riser 1097-2 is another example slug mitigation assembly 1010-2. Slug mitigation assembly 1010-1 and slug mitigation assembly 1010-2 are tied to a common header in piping 1088, which is disposed between the slug mitigation assemblies 1010 and the field equipment 1092. In this case, both slug mitigation assemblies 1010, the additional piping 1088, and the field equipment 1092 are disposed above the water level 1093 and at or above the operating platform 1096. Also, in this example, both slug mitigation assemblies 1010 are oriented horizontally (i.e., having long axes that are parallel with a major plane of the operating platform 1096).

Slug mitigation assembly 1010-1, riser 1097-1, wellhead equipment 1091-1, and subsea flowline 1089-1 can be isolated, in full or in part, from the additional piping 1088 and the field equipment 1092 by valve $V_2$. Similarly, slug mitigation assembly 1010-2, riser 1097-2, wellhead equipment 1091-2, and subsea flowline 1089-2 can be isolated, in full or in part, from the additional piping 1088 and the field equipment 1092 by valve $V_1$. One or more of the characteristics (e.g., angles, diameters, shape, size, number of segments) of slug mitigation assembly 1010-1 can be the same as or different than the corresponding characteristics of slug mitigation assembly 1010-2. In addition to what is shown in FIG. 10, multiple slug mitigation assemblies 1010 can be placed in series and/or in parallel with each other, placed in close proximity to each other or spaced apart by some distance, and/or configured any of a number of other ways in order to more efficiently reduce slugs from accumulating in piping during a field operation.

FIG. 11 shows a single-line configuration of still another field system 1100 in accordance with certain example embodiments. Referring to FIGS. 1 through 11, the field system 1100 of FIG. 11 is substantially similar to the field system 1000 of FIG. 10, except as described below. For example, the field system 1100 of FIG. 11 includes field equipment 1192 located on or above an operating platform 1196, which is disposed above a water level 1193 of water 1194. In this case, there are two risers 1197 (riser 1197-1 and riser 1197-2). Both risers 1197 extend downward from the operating platform 1196 to approximately the subsea surface 1102. At the bottom of riser 1197-1 is wellhead equipment 1191-1, and extending beyond wellhead equipment 1191-1 along the subsea surface 1102 is a subsea flowline 1189-1. Similarly, at the bottom of riser 1197-2 is wellhead equipment 1191-2, and extending beyond wellhead equipment 1191-2 along the subsea surface 1102 is a subsea flowline 1189-2.

Disposed at the top of riser 1197-1 and riser 1197-2 is a single header 1181 at or near the operating platform 1196. The header 1181 leads to a slug mitigation assembly 1110, which is coupled to piping 1188, which in turn is coupled to the field equipment 1092. In this case, the slug mitigation assembly 1110 is oriented horizontally (i.e., having a long axis in parallel with a major surface of the operating platform 1096). Riser 1197-1, wellhead equipment 1191-1, and subsea flowline 1189-1 can be isolated, in full or in part, from the header 1181, the slug mitigation assembly 1110, piping 1188, and the field equipment 1192 by valve $V_2$. Similarly, riser 1197-2, wellhead equipment 1191-2, and subsea flowline 1189-2 can be isolated, in full or in part, from the header 1181, the slug mitigation assembly 1110, piping 1188 and the field equipment 1192 by valve $V_1$.

Figure 12:
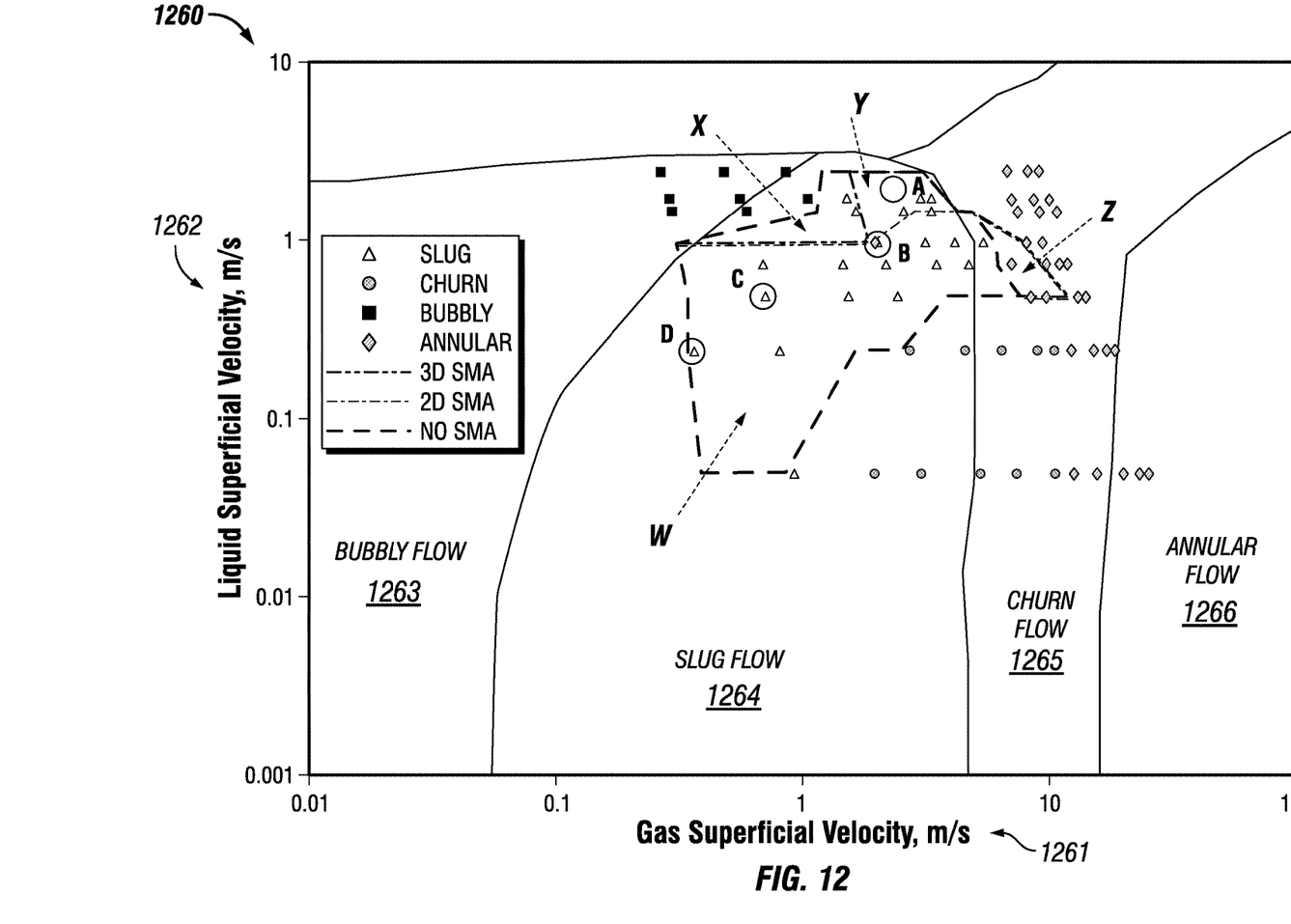
FIG. 12 is a graph showing how example embodiments affect performance under slugging flow regimes.

FIG. 12 is a graph 1260 showing how example embodiments affect performance under slugging flow regimes. Referring to FIGS. 1 through 12, the graph 1260 plots gas superficial velocity 1261 (in meters per second) on a logarithmic scale along the X-axis, and the liquid superficial velocity 1262 (in meters per second) on a logarithmic scale along the Y-axis. The graph 1260 shows three slugging boundaries 1251, 1252, and 1253, where each slugging boundary is for a different piping configuration. One slugging boundary 1251 is for a piping configuration that includes a three-dimensional slug mitigation assembly (3D SMA), such as what is shown in FIGS. 2, 3, and 5. A second slugging boundary 1252 is for a piping configuration that includes a two-dimensional slug mitigation assembly (2D SMA), such as what is shown in FIG. 4. The third slugging boundary 1253 is for a piping configuration that does not include a slug mitigation assembly.

The graph 1260 shows, by a comparison of slugging boundary 1252 versus slugging boundary 1253, that there are some regions, marked as X and Y where slugging disappears using 2D SMA versus no SMA, which means that the slugging area is greatly reduced using 2D SMA for higher liquid superficial velocity 1262, substantially regardless of the gas superficial velocity 1261.

The graph also shows, by a comparison of slugging boundary 1251 versus slugging boundary 1253, that there are some regions, marked as X where slugging disappears using 3D SMA versus no SMA, which means that the slugging area is greatly reduced using 2D SMA for higher liquid superficial velocity 1262, but only up to about 1.5 m/s of gas superficial velocity 1261. Above about 1.5 m/s of gas superficial velocity 1261, the effectiveness of the 3D SMA in preventing slugging is lost, and slugging boundary 1251 and slugging boundary 1253 are essentially coincident. Comparing slugging boundaries 1251, 1252, and 1253, in the region of the graph 1260 marked as Z, both 2D SMA and 3D SMA have slugging, where there would be no slugging in a piping configuration without a SMA.

To further explore the slug mitigation capability of SMAs, bifurcation analyses was conducted for four flow conditions, marked as A, B, C and D in FIG. 12. Details of these conditions are given in following table:

| FLOW CONDITIONS | A | B | C | D |
|---|---|---|---|---|
| Water mass flowrate (kg/s) | 3.00 | 2.00 | 1.00 | 0.50 |
| Superficial velocity of water (m/s) | 1.48 | 0.99 | 0.71 | 0.25 |
| Air volumetric flowrate (Sm³/h) | 50.00 | 40.00 | 10.00 | 7.00 |
| Superficial velocity of air (m/s) | 2.59 | 2.55 | 0.49 | 0.36 |

Using the choke valve connected downstream of SMAs, bifurcations maps of these four flow conditions can be obtained. The critical points of these bifurcation maps are summarized in the following table:

| BOUNDARY LABEL | S-SHAPE RISER CONFIGURATION | CRITICAL BIFURCATION POINT (%) | RISER BASE PRESSURE (barg) |
|---|---|---|---|
| A | 2D SMA | 100 | 2.24 |
| A | NO SMA | 35 | 3.8 |
| A | 3D SMA | 36 | 3.7 |
| B | 2D SMA | 33 | 3.1 |
| B | NO SMA | 29 | 3.75 |
| B | 3D SMA | 31 | 3.3 |
| C | 2D SMA | 23 | 3.7 |
| C | NO SMA | 22 | 3.8 |
| C | 3D SMA | 21 | 3.9 |
| D | 2D SMA | 20 | 2.7 |
| D | NO SMA | 19 | 2.8 |
| D | 3D SMA | 19 | 3.0 |

In bifurcation analysis, a critical point indicates the minimal riser base pressure to eliminate slug flow by manual choking. Therefore, the smaller the critical pressure, the more efficient the slug mitigation approach. As indicated in the preceding table, a pipe configuration that includes 2D SMA has the minimum critical pressures for all four conditions. Also, while a pipe configuration that includes 3D SMA is better than a pipe configuration with no SMA under conditions A and B (high liquid flow rates), a pipe configuration with no SMA is better than a pipe configuration that includes 3D SMA under conditions C and D (low liquid flow rate). Since these four conditions cover all slug areas in FIG. 12, it can be determined that a pipe configuration that includes 2D SMA is capable of being enhanced using a choke valve for slug mitigation for any flow conditions.

Example embodiments can provide for more effective slug mitigation in a field operation. Specifically, example slug mitigation assemblies described herein can have any of a number of configurations. Further, example slug mitigation assemblies described herein can be located close to or above a water line for easier maintenance and problem solving. Further, multiple slug mitigation assemblies can be arranged in series and/or in parallel with each other to further increase the effectiveness of mitigating slug during a field operation. Example embodiments can have a number of benefits, including more efficient slug mitigation, decreased down time, higher ease of maintenance, and reduced overall costs.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for mitigating slugging in the conveyance of a subterranean resource, the system comprising:
   at least one first pipe disposed proximate to a subterranean formation and having a substantially vertical orientation, wherein the at least one first pipe has a first cavity through which the subterranean resource traverses from the subterranean formation disposed under a subsea surface;
   at least one second pipe disposed proximate to field equipment at an operating platform, wherein the at least one second pipe has a second cavity through which the subterranean resource traverses, wherein the field equipment is used to extract the subterranean resource; and a first slug mitigation assembly disposed between the at least one first pipe and the at least one second pipe, wherein the first slug mitigation assembly comprises a first plurality of rigid non-linear segments for reducing accumulation of gas or liquid pockets in the subterranean resource as the subterranean resource flows therethrough, wherein the first slug mitigation assembly substantially maintains its shape over time as the subterranean resource flows therethrough.

2. The system of claim 1, wherein the first plurality of non-linear segments of the first slug mitigation assembly are arranged in a planar configuration.

3. The system of claim 1, wherein the first slug mitigation assembly further comprises a plurality of linear segments.

4. The system of claim 1, wherein the first slug mitigation assembly further comprises a second plurality of non-linear segments.

5. The system of claim 1, wherein the first plurality of non-linear segments of the first slug mitigation assembly are arranged in a spiral configuration.

6. The system of claim 5, wherein at least one non-linear segment of the first plurality of non-linear segments comprises a 45° elbow twisted by approximately 30°.

7. The system of claim 1, wherein the at least one first pipe is disposed in water, and wherein the at least one second pipe and the first slug mitigation assembly are disposed above water.

8. The system of claim 1, wherein the at least one first pipe and the first slug mitigation assembly are disposed in water, and wherein the at least one second pipe is disposed above water.

9. The system of claim 1, wherein the first slug mitigation assembly is disposed in parallel with respect to the operating platform.

10. The system of claim 1, wherein the first slug mitigation assembly is disposed perpendicular to the operating platform.

11. The system of claim 1, further comprising:
at least one third pipe disposed proximate to the subterranean formation and having the substantially vertical orientation, wherein the at least one third pipe has a third cavity through which the subterranean resource traverses from the subterranean formation,
wherein the first slug mitigation assembly is further disposed between the at least one second pipe and the at least one third pipe.

12. The system of claim 1, further comprising:
at least one third pipe disposed proximate to the subterranean formation and having the substantially vertical orientation, wherein the at least one third pipe has a third cavity through which the subterranean resource traverses from the subterranean formation; and
a second slug mitigation assembly disposed between the at least one third pipe and the at least one second pipe, wherein the second slug mitigation assembly comprises a second plurality of non-linear segments for reducing accumulation of the gas or liquid pockets in the subterranean resource as the subterranean resource flows therethrough.

13. The system of claim 12, wherein the first slug mitigation assembly and the second slug mitigation assembly are configured differently with respect to each other.

14. The system of claim 12, wherein the first slug mitigation assembly and the second slug mitigation assembly are configured substantially similar with respect to each other.

15. A slug mitigation assembly for mitigating slug accumulation in a field operation, the slug mitigation assembly comprising:
a plurality of first rigid non-linear segments disposed in series with each other, wherein the plurality of first rigid non-linear segments form a body; and
wherein a first end of the body is configured to be coupled to a proximal end of a first pipe section, wherein the first pipe section, at least in part, has a substantially vertical orientation and is disposed proximate to and above a subterranean formation disposed under a subsea surface, and wherein a second end of the body is configured to be coupled to a second pipe section disposed proximate to field equipment, wherein the field equipment is disposed proximate to an operating platform,
wherein the body is configured to allow a subterranean resource to flow therethrough, and
wherein the plurality of first rigid non-linear segments are configured to substantially maintain their shape in order to reduce accumulation of gas or liquid pockets in the subterranean resource as the subterranean resource flows therethrough.

16. The slug mitigation assembly of claim 15, wherein each first non-linear segment of the plurality of first non-linear segments is bent at a first angle and twisted along a length of the first non-linear segment at a second angle.

17. The slug mitigation assembly of claim 16, wherein the body is substantially planar.

18. The slug mitigation assembly of claim 16, wherein each first non-linear segment of the plurality of first non-linear segments is further twisted along a length of the first non-linear segment at a third angle.

19. The slug mitigation assembly of claim 16, further comprising:
a pair of second non-linear segments, wherein one of the second non-linear segments is disposed at a first end of the body and is configured to be coupled to the first pipe section, and wherein another of the second non-linear segments is disposed at a second end of the body and is configured to be coupled to the second pipe section, wherein the pair of second non-linear segments is bent at a third angle.

20. The slug mitigation assembly of claim 15, further comprising:
a plurality of linear segments, wherein each linear segment of the plurality of linear segments is disposed between two first non-linear segments.

* * * * *